United States Patent [19]
Knodt et al.

[11] Patent Number: 5,105,220
[45] Date of Patent: Apr. 14, 1992

[54] OPERATOR INTRODUCTION SCREEN

[75] Inventors: Ruediger W. Knodt; David E. Miller; James B. Williams, all of Rochester, N.Y.

[73] Assignee: Xerox Corporation, Stamford, Conn.

[21] Appl. No.: 563,121

[22] Filed: Aug. 6, 1990

[51] Int. Cl.$^5$ .............................................. G03G 15/00
[52] U.S. Cl. ...................... 355/209; 434/227
[58] Field of Search .................. 355/209; 340/712; 364/146; 434/227, 228, 230, 231, 118

[56] References Cited

U.S. PATENT DOCUMENTS

| | | | |
|---|---|---|---|
| Re. 32,253 | 9/1986 | Bartulis et al. | 355/209 |
| 4,322,814 | 3/1982 | Menezes et al. | 364/900 |
| 4,438,326 | 3/1984 | Uchida | 235/379 |
| 4,649,515 | 3/1987 | Thompson et al. | 364/900 |
| 4,682,158 | 7/1987 | Ito et al. | 340/679 |
| 4,792,827 | 10/1988 | Ogura | 355/207 |
| 4,799,081 | 1/1989 | Kikuno et al. | 355/209 |

*Primary Examiner*—Joan H. Pendegrass
*Attorney, Agent, or Firm*—Ronald F. Chapuran

[57] ABSTRACT

A method and apparatus for coaxing a novice operator into dialogue with a touch screen display and for directing the operator to program the machine including a soft display actuator displayed on the first frame of the touch screen display of the user interface, a pointer displayed adjacent to the acutator, the pointer simulating a human action with respect to the actuator, the human action suggesting to the operator the manual engagement of the actuator, and a control responsive to the manual engagement of the actuator to provide a subsequent frame on the touch screen display of the user interface, the subsequent frames providing progressively more complex operator options.

9 Claims, 8 Drawing Sheets

OPERATOR INTRODUCTION SCREEN

The invention relates to the machine/operator interface, and more particularly, to a system for facilitating the introduction of an operator to a touch screen display and establishing a natural dialogue between operator and machine.

As reproduction machines such as copiers and printers become more complex and versatile in operation, the user interface between the machine and the operator must necessarily be made as simple and effortless as possible if full and efficient utilization of the machine is to be realized. A suitable interface must not only provide the controls, displays, and messages necessary to activate, program, monitor, and maintain the machine, but must also provide a level of messages and operator prompts for a wide range of trained and untrained operators to accurately and efficiently program the machine for various reproduction runs. A primary concern is the smooth transition of a novice operator into familiarity with touch screen operation and to avoid the distraction and alienation of a screen with an overwhelming display of graphics displays and text messages, leaving the novice operator in a state of confusion on how to proceed.

Various prior art techniques are directed to operator messages and prompts as described below:

U.S. Pat. No. 4,322,814 to Menezes et al. discloses an error detection system for use in an editing apparatus. The system includes a central processing unit comprising an error detector responsive to the operation of a control switch to detect if data displayed in a selected display register is enabling for carrying out an editing operation. If the data is not enabling, the system inhibits the edit operation and actuates selected ones of indicators to notify an operator of an error condition.

U.S. Pat. No. 4,649,515 to Thompson et al. discloses a method and apparatus for fault diagnosis and control of a system. The system comprises two levels of rules including domain specific rules in the form of a list stored in a memory, and meta-level rules also stored in memory. The meta-level rules search a knowledge base and efficiently construct a rule network to detect and report malfunctions, output control signals for modifying the operation of a monitored system, and aid uses by providing information relative to malfunctions which pinpoints probable causes.

U.S. Pat. No. 4,682,158 to Ito et al. discloses a guidance device for controlling various functions of a machine. Sensors within a machine respond to various maintenance or diagnostic conditions. Signals from the sensors cause a storage means to supply corresponding prompts to a display to prompt a needed maintenance or diagnostic procedure. When an appropriate procedure has been performed, additional prompts for subsequent procedures are displayed if appropriate.

U.S. Pat. No. 4,438,326 to Uchida discloses a system for performing transactions wherein a customer may follow instructions comprising a procedure specifying message and a procedure specifying illustration. In a test mode selected by a clerk, a display unit shows an operation test code for a particular function button. When a trouble has been detected, the display unit shows the cause of the detected trouble and provides instructions for the clerk.

U.S. Pat. No. 4,792,827 to Ogura discloses a display device for use in an image forming apparatus including a condition detection member, a display section, and a first input key for causing a first message to be displayed on the display section. The first message represents guidance for operating the apparatus. Second and third input keys are further provided for causing second and third messages to be displayed representative of guidance for an operation procedure.

A difficulty with the prior art systems is that generally there is not a means to differentiate between trained and untrained, skilled or unskilled machine operators. If the machine messages and prompts are geared to an untrained level, a skilled operator will become impatient and maybe even confused by the slow, deliberate display of messages and prompts intended for an unskilled operator. At best the efficiency of the skilled operator will be compromised, and the deliberate style of displays could even lead to programming errors. On the other hand, a machine user interface geared to a skilled level of operator may be efficient for the skilled operator, but could easily result in confusion and delay for the unskilled operator. Pending application, U.S. Ser. No. 07/328,975, assigned to the same assignee as the present invention discloses a technique of automatically altering the messages for prompting the operator, depending upon the level of operator training, including the steps of programming the machine at a first level, recognizing the programming of the machine at the first level to represent either trained or untrained operator programming, and responding to the recognition of either trained or untrained operator programming at the first level for providing either a trained sequence of operator prompts or an untrained sequence of operator prompts.

A difficulty with such a technique as described above is that the initial introduction to the machine is the same for novice and experienced operators. An experienced operator generally has little difficulty in understanding the screen displays and is able to efficiently program and operate from the beginning. For a novice operator, however, the likelihood of the lack of understanding and resultant programming errors is often very high, particularly with the first introduction to a touch screen display. It would be desirable to provide an efficient transition of a novice operator into familiarity with a touch screen display and to avoid an overwhelming display of graphics and text messages. p It is an object of the present invention, therefore, to provide a new and improved technique for introducing a novice operator to a touch screen display operator interface. It is another object of the present invention to provide a technique of displaying a combination of graphic symbols and text arranged on a touch screen display to invite and teach and at the same time direct a first time user into a touch screen control. It is a further object of the present invention to provide a combination of graphic symbols introducing a human element suggesting required action and for coaxing an operator into dialogue with the machine. Further advantages of the present invention will become apparent as the following description proceeds and the features characterizing the invention will be pointed out with particularity in the claims annexed to and forming a part of this specification.

SUMMARY OF THE INVENTION

Briefly, the present invention is the method and apparatus for coaxing a novice operator into dialogue with a touch screen display, for creating an understanding of a touch screen display, and for directing the operator to program the machine including a soft display actuator displayed on the first frame of the touch screen display of the user interface, a pointer displayed adjacent to the actuator, the pointer simulating a human action with respect to the actuator, the human action suggesting to the operator the manual engagement of the actuator, and a control responsive to the manual engagement of the actuator to provide a subsequent frame on the touch screen display of the user interface, the subsequent frames providing progressively more complex operator options. Also included in the control are displays of linear designs suggesting the function of document manipulation by engaging a touch target.

For a better understanding of the present invention, reference maybe had to the accompanying drawings wherein the same reference numerals have been applied to like parts and wherein:

DETAILED DESCRIPTION OF THE INVENTION

Figure 1:
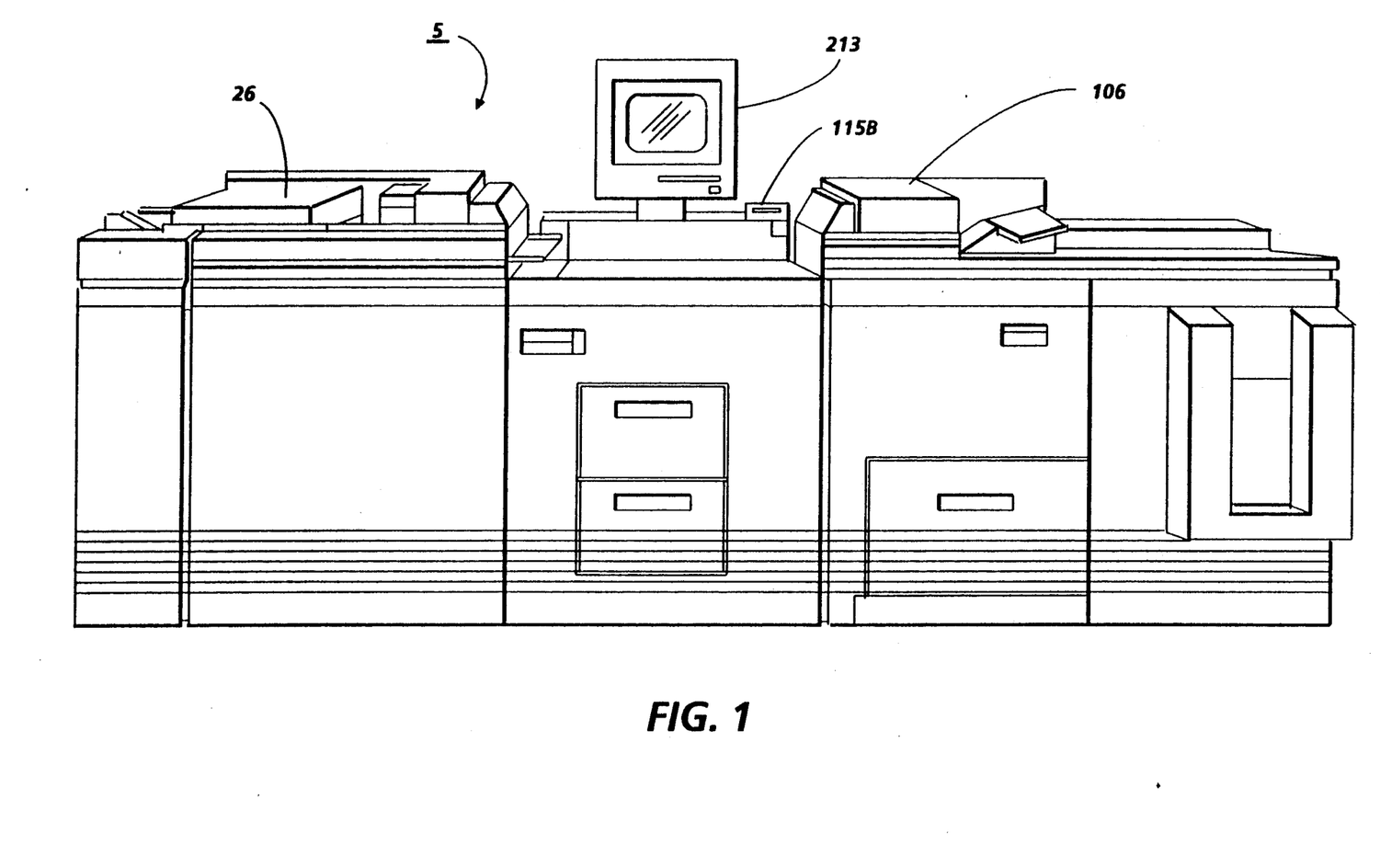
FIG 1 is an isometric view of an illustrative reproduction machine incorporating the present invention.
Figure 2:
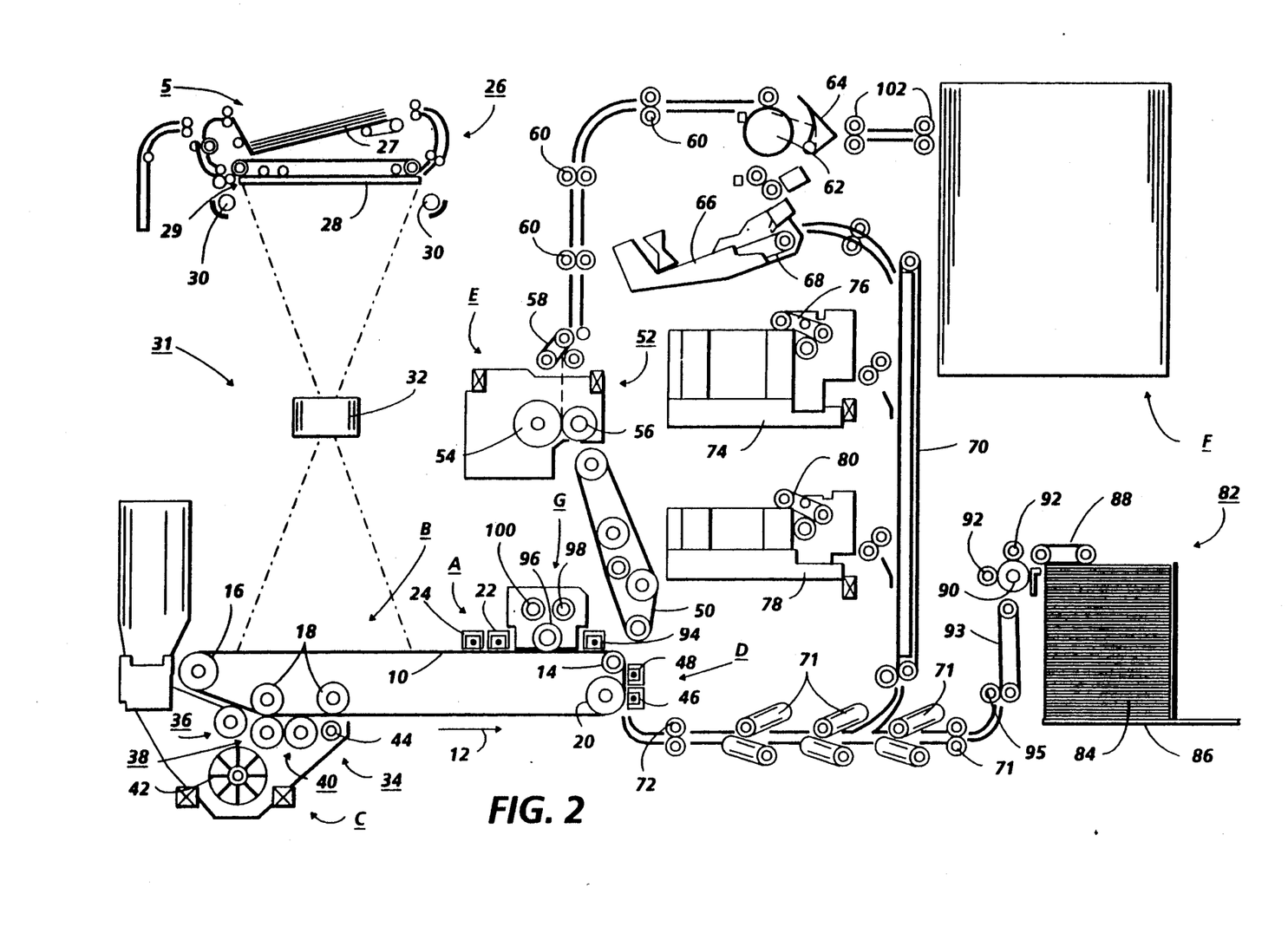
FIG. 2 is a schematic elevational view depicting various operating components and sub-systems of the machine shown in FIG. 1.

Referring to FIGS. 1 and 2, there is shown an electrophotographic reproduction machine 5 composed of a plurality of programmable components and sub-systems which cooperate to carry out the copying or printing job programmed through a touch dialogue User Interface (U.I.). Machine 5 is typical of the machine incorporating the present invention and employs a photoconductive belt 10. Belt 10 is entrained about tripping roller 14, tensioning roller 16, idler rollers 18, and drive roller 20. Drive roller 20 is rotated by a motor coupled thereto by suitable means such as a belt drive. As roller 20 rotates, it advances belt 10 in the direction of arrow 12 through the various processing stations disposed about the path of movement thereof.

Initially, the photoconductive surface of belt 10 passes through charging station A where two corona generating devices, indicated generally by the reference numerals 22 and 24 charge photoconductive belt 10 to a relatively high, substantially uniform potential. Next, the charged photoconductive belt is advanced through imaging station B. At imaging station B, a document handling unit 26 sequentially feeds documents from a stack of documents in a document stacking and holding tray into registered position on platen 28. A pair of Xenon flash lamps 30 mounted in the optics cavity illuminate the document on platen 28, the light rays reflected from the document being focused be lens 32 onto belt 10 to expose and record an electrostatic latent image on photoconductive belt 10 which corresponds to the informational areas contained within the document currently on platen 28. After imaging, the document is returned to the document tray via a simplex path when either a simplex copy or the first pass of a duplex copy is being made or via a duplex path when a duplex copy is being made.

The electrostatic latent image recorded on photoconductive belt 10 is developed at development station C by a magnetic brush developer unit 34 having three developer rolls 36, 38 and 40. A paddle wheel 42 picks up developer material and delivers it to the developer rolls 36, 38. Developer roll 40 is a cleanup roll while a magnetic roll 44 is provided to remove any carrier granules adhering to belt 10.

Following development, the developed image is transferred at transfer station D to a copy sheet. There, the photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detach the copy sheet from belt 10.

Following transfer, a conveyor 50 advances the copy sheet bearing the transferred image to fusing station E where a fuser assembly, indicated generally by the reference numeral 52 permanently affixes the toner powder image to the copy sheet. Preferably, fuser assembly 52 includes a heated fuser roller 54 and a pressure roller 56 with the powder image on the copy sheet contacting fuser roller 54.

After fusing, the copy sheets are fed through a decurler 58 to remove any curl. Forwarding rollers 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70 and rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from the auxiliary tray 78 by sheet feeder 80. Sheet feeders 76, 80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to a take away drive roll 90 and idler rolls 92. Rolls 90, 92 guide the sheet onto transport 93 which in cooperation with idler roll 95 and rolls 72 move the sheet to transfer station station D.

After transfer station D, photoconductive belt 10 passes beneath corona generating device 94 which charges any residual toner particles remaining on belt 10 to the proper polarity. Thereafter, a pre-charge erase lamp (not shown), located inside photoconductive belt 10, discharges the photoconductive belt in preparation for the next charging cycle. Residual particles are removed from belt 10 at cleaning station G by an electrically biased cleaner brush 96 and two de-toning rolls 98 and 100.

The various functions of machine 5 are regulated by a controller which preferably comprises one or more programmable microprocessors. The controller provides a comparison count of the copy sheets, the number of documents being recirculated, the number of copy sheets selected by the operator, time delays, jam corrections, etc. As will appear, programming and operating control over machine 5 is accomplished through a User Interface. Operating and control information, job programming instructions, etc. are store din a suitable memory which includes both ROM and RAM memory types. Conventional sheet path sensors or switches may be utilized to keep track of the position of the documents and the copy sheets. In addition, the controller regulates the various positions of the gates depending upon the mode of operation selected.

Figure 3:
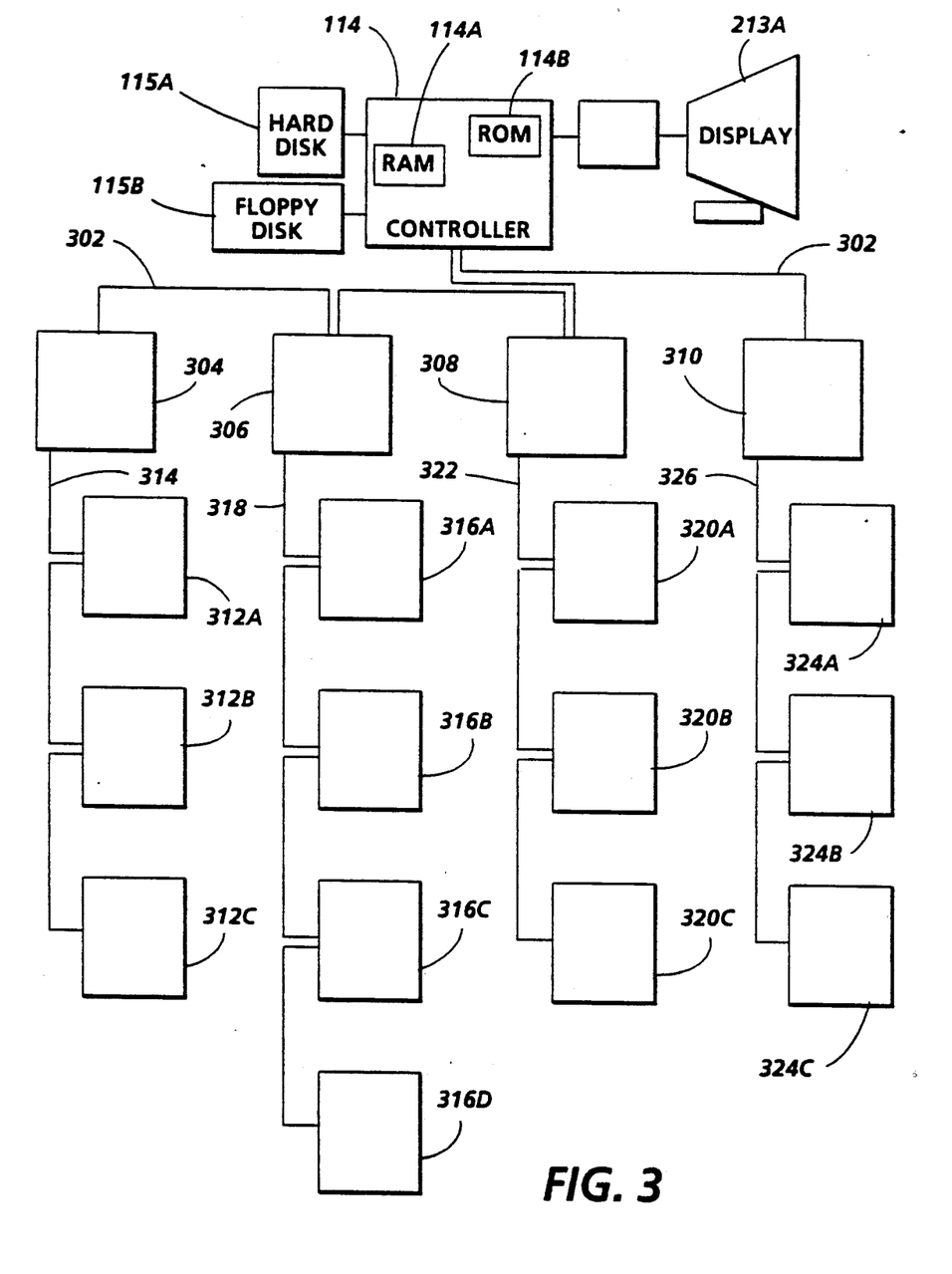
FIG. 3 is a block diagram of the operating control systems and memory for the machine shown in FIG. 1.

With reference to FIG. 3, memory 115 includes a hard or rigid disk drive 115A and a floppy disk drive 115B connected to Controller 114. In a preferred embodiment, the rigid disks are two platter, four head disks with a formatted storage capacity of approximately 20 megabytes. The floppy disks are 3.5 inch, dual sided micro disks with a formatted storage capacity of approximately 720 kilobytes. Preferably, all of the control code and screen display information for the machine is loaded from the rigid disk at machine power up. Changing the data that gets loaded into the machine for execution can be done by exchanging the rigid disk in the machine 5 for another rigid disk with a different version of data or by modifying the contents of the current rigid disk by transferring data from one or more floppy disks onto the rigid disk using the floppy disk drive built into the machine 5. Suitable display 213A of U.I. 213 is also connected to Controller 114 as well as a shared line system bus 302.

The shared line system bus 302 interconnects a plurality of core printed wiring boards including an input station board 304, a marking imaging board 306, a paper handling board 308, and a finisher/binder board 310. Each of the core printed wiring boards is connected to local input/output devices through a local bus. For example, the input station board 304 is connected to digital input/output boards 312A and 312B and servo board 312C via local bus 314. The marking imaging board 306 is connected to analog/digital/analog boards 316A, 316B, digital input/output board 316C, and stepper control board 316D through local bus 318. In a similar manner, the paper handling board 308 connects digital input/output boards 320A, B and C to local bus 322, and finisher/binder board 310 connects digital input/output boards 324A, B and C to local bus 326.

Figure 4:
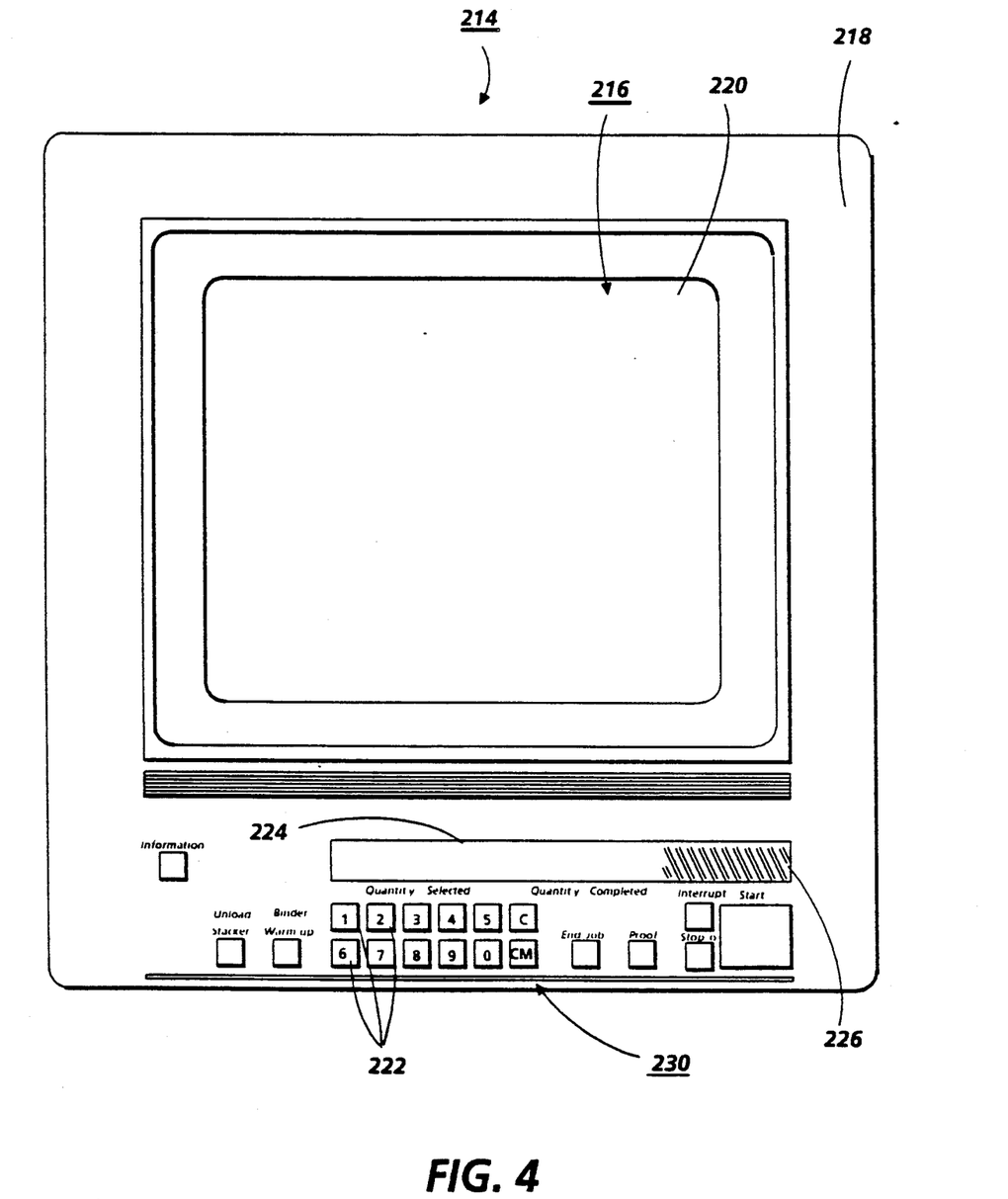
FIG. 4 is a are front view of the of the user interface of the machine of FIG. 1.

Referring to FIG. 4, there is shown the color touch monitor 214 for the touch dialogue U.I. 213 of the present invention. As will appear, monitor 214 provides an operator user interface with hard and soft touch control buttons enabling communication between operator and machine 10. Monitor 214 comprises a suitable color cathode ray tube 216 of desired size and type having a peripheral framework forming a decorative bezel 218 thereabout. Bezel 218 frames a rectangular video display screen 220 on which soft touch buttons in the form of icons or pictograms and messages are displayed as will appear together with a series of hard control buttons 222 and 10 seven segment displays 224 therebelow. Displays 224 provide a display for copy "Quantity Selected", copy "Quantity Completed", and an area 226 for other information.

Hard control buttons 222 comprise "0-9" buttons providing a keypad 230 for programming copy quantity, code numbers, etc.; a clear button "C" to reset display 224; a "Start" button to initiate print; a clear memory button "CM" to reset all dialogue mode features to default and place a "1" in the least significant digit of display 224; an "Unload Stacker" button requesting transfer of the contents of stacker 128; a "Stop" button to initiate an orderly shutdown of machine 5; a "Binder Warm-up" button to initiate warm-up of binder 126; an "interrupt" button to initiate a job interrupt; a "Proof" button to initiate making of a proof copy; an "End Job" button to end the current job; and an "i" button to initiate a request for information.

Operator programming of the machine via the U/I is a facilitated through display of programming screen or frames on CRT display 220 which represent programming features of the machine. Signals from IR touch sensors are fed to the machine controller where they are interpreted with respect to the current programming screen. Subsequently operator selections are displayed on CRT display 220 and the appropriate machine subsystems are enabled, disabled or adjusted accordingly.

Figure 5:
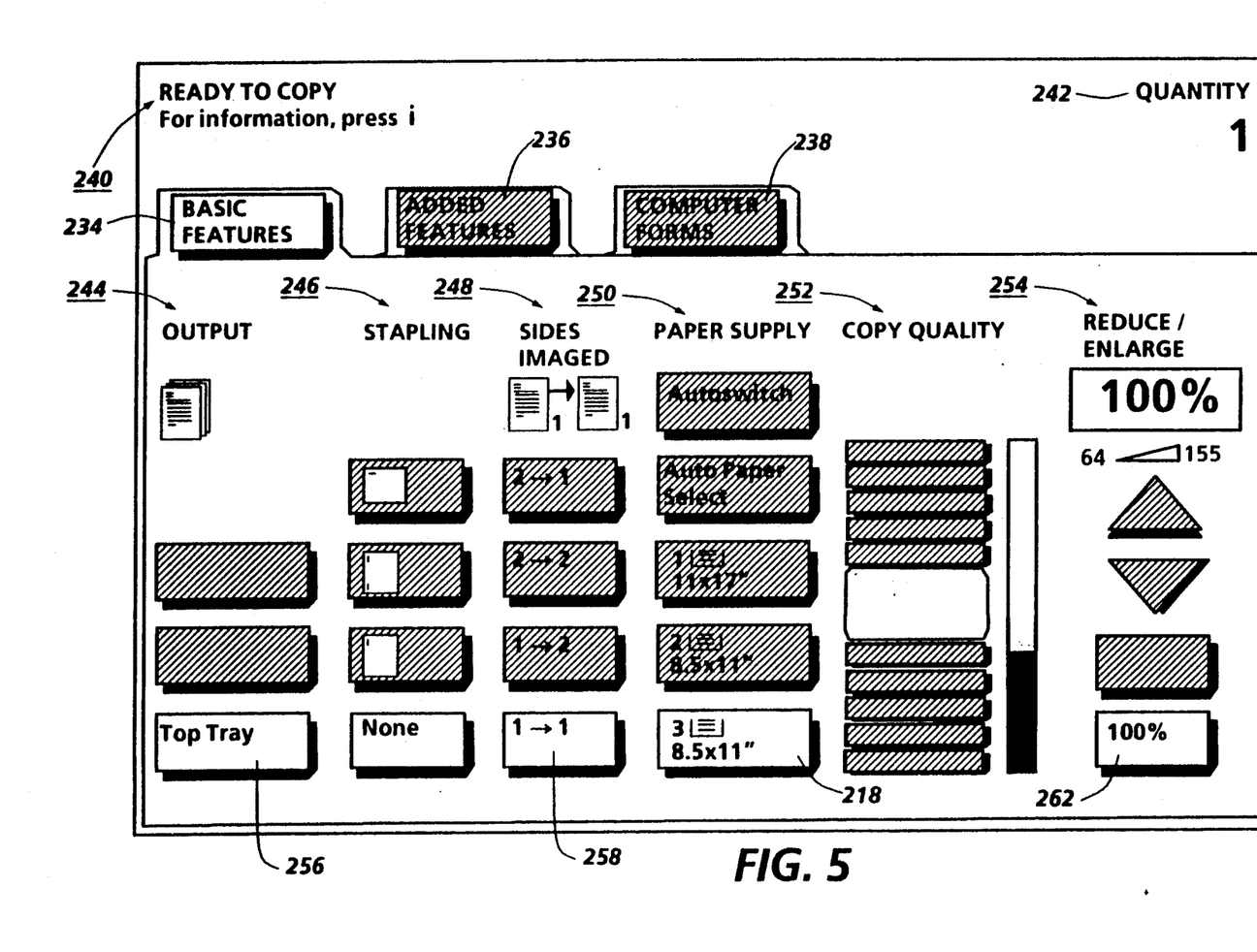
FIG. 5 is a typical initial touch screen display for operator—machine dialogue of the machine of FIG. 1.

Programming screens or frames, as displayed on CRT display 220, are used by the operator to select the feature set appropriate for the completion of a copying job. Specifically, the programming screens consist of a series of three primary screens, arranged in a file folder or tab format, as illustrated in FIG. 5. In certain instances, selection of specific programming features can only be done to the exclusion of other features due to machine constraints or known undesirable outcomes (i.e. stapling of transparency copy sheets). The currently programmed feature set is always displayed using programming frames, where selected features are indicated as highlighted or white buttons and disabled or deselected features are indicated with a gray background.

With reference to FIG. 5, there is illustrated a typical user interface display or screen providing an operator/machine dialogue. The screen presents to the operator in the form of tabs, a basic features mode 234, an added features mode 236, and a computer forms mode 238. Also at the top of the display frame are a machine ready indicator 240 and a quantity programmed indicator 242. The three modes typically could be in a gray appearance and upon selection of a particular mode such as the top tray 256 by the operator, the top tray soft button would transform from a gray appearance to a white appearance. There are also illustrated basic programming features available to the operator other than the quantity or number of copies to be produced, such a copy output feature 244, a stapling feature 246, copy sides feature 248, a paper supply feature 250, a copy quality feature 252 and a reduction and enlarge feature 254. These features display to the operator a variety of options available to program the machine. For example, the copy output feature can offer the operator an uncollated mode, a collated mode, or simply a single sheet top tray mode illustrated at 256.

Similarly, various other "soft" buttons are available for the operator to select a particular stapling feature 246 format for the stapling of completed sets or various combinations of simplex or duplex copying, a one-to-one simplex mode 258 being illustrated in FIG. 5 as the option selected by the operator or the paper supply or feature 250 from which copy sheets are desired to be provided from. Similarly there are options to determine copy quality such as lighter or darker and reduction and enlargement from 65% to 155%, FIG. 5 illustrating a particular copy quality selection and also a reduction/enlargement selection 262 of 100%.

With reference to FIG. 4 the hard control buttons such as at 222 are in a familiar format or style to even a novice machine or display user because of the keyboard-like setting. On the other hand, many machine users to initiate programming operations. In fact, such a display as screen to initiate programming operations. In fact, such display as illustrated in FIG. 5 can often be confusing to an operator. Even if the operator or user is familiar with the copier options such as copy output, paper supply, copy quality, and reduction and enlargement, where and how to begin the selection process can be a source of perplexity. Even though the screen displayed "soft buttons" have geometric displays that appear to be buttons or selectors, nevertheless the graphic displays are only two-dimensional and do not have the familiarity as the typical three-dimensional hard button. A novice operator confronted with a display as illustrated in FIG. 5 can easily become confused and waste valuable time in ultimately understanding how to initiate the basic programming of the machine.

Figure 6:
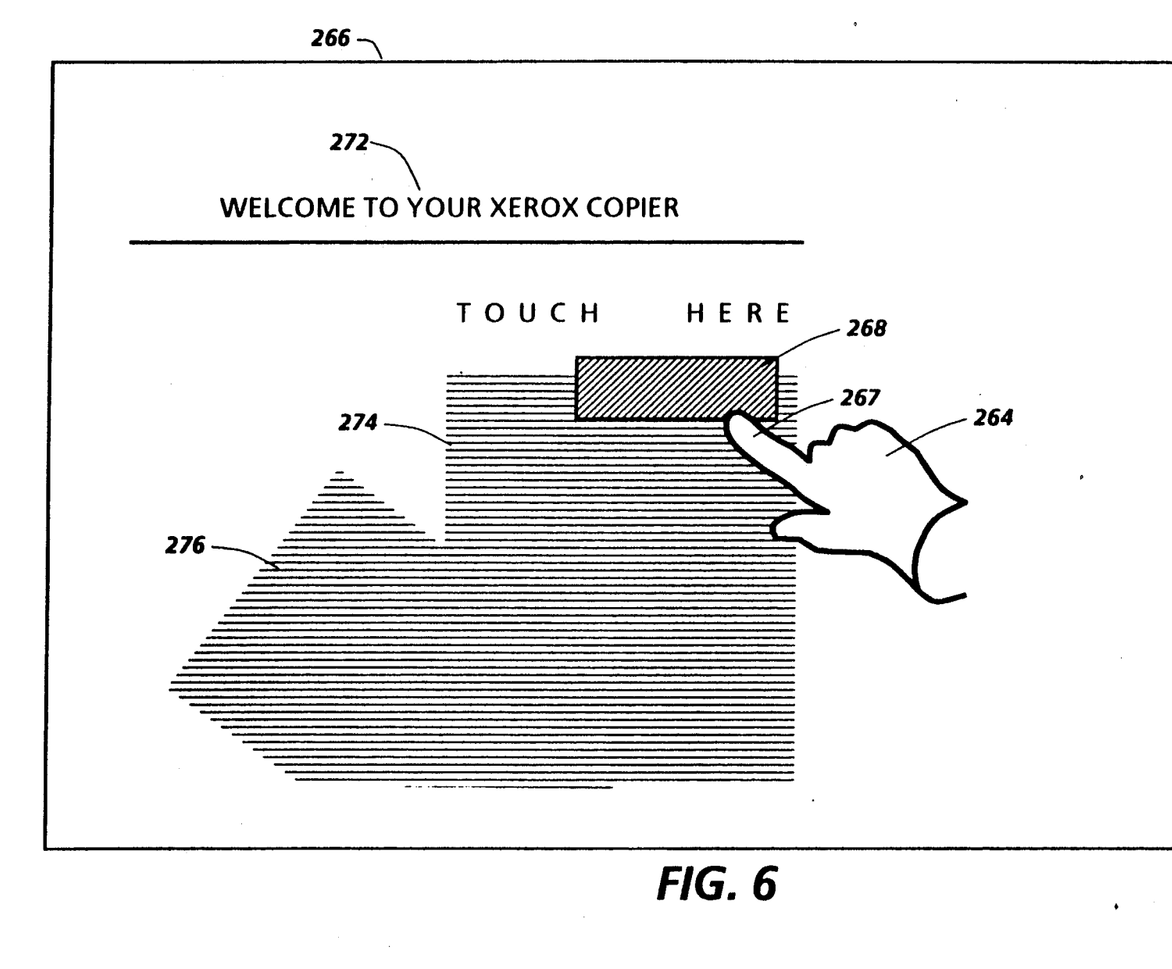
FIG. 6 is the initial touch screen display for operator—machine dialogue of the machine of FIG. 1 in accordance with the present invention.

In accordance with the present invention, a typical first display screen, as illustrated in FIG. 5, is replaced with an initial display screen as illustrated in FIG. 6. The display screen of FIG. 6 has the immediate impact or effect upon the novice and unexperienced operator of immediately conveying to the operator the concept of operation of a display screen with soft buttons. It is also automatically displayed after a period of non-use. The substance of the display is the human element or the electronic abstract rendition of a hand 264 immediately conveying to the operator the impression of human participation in the programming process and its relationship to the display screen. The finger 266 on the hand 264 clearly and unequivocally points to or engages the soft button 268 or rectangular shaded display to immediately convey the "touch here" message 267 graphically as the prime mode of programming the machine. The touching the glass screen barrier is at once removed and the operator is taught the basic technique for communication and dialogue with the machine.

The various graphic and textual messages can be used to breakdown the operator display screen barrier such as text 270 to welcome the operator or text 272 to invite the operator into engagement with the button 268. The graphic linear displays 274, 276, one in a vertical direction and the other offset or rotated from the vertical at approximately 45° convey document manipulation, in fact suggesting to the operator the very operations such as document reproduction that the operator will be performing. Adequate textual messages reinforce this image, but the essential purpose of this display is to eliminate the operator machine barrier with respect to the display screen and quickly coax the operator into touching an engaging the soft buttons on the display screens.

In essence, the operator is easily drawn into engagement with the touch screen by the simultaneous display on the screen of the actuator or soft button 268 and a pointer 266 displayed adjacent to the actuator, preferably the pointer simulating a human action with respect to the actuator, the human action being the suggestion of the manual engagement with the actuator. In a preferred embodiment, upon engagement of the soft button or actuator of FIG. 6, the next frame or display on the screen would be the frame or display as disclosed in FIG. 5. At this point, upon being confronted by the display as illustrated in FIG. 5, the novice operator has been initiated into the soft button display psychology and has little trepidation or apprehension about engaging the various soft buttons to make the appropriate programming selections.

Figure 7A:
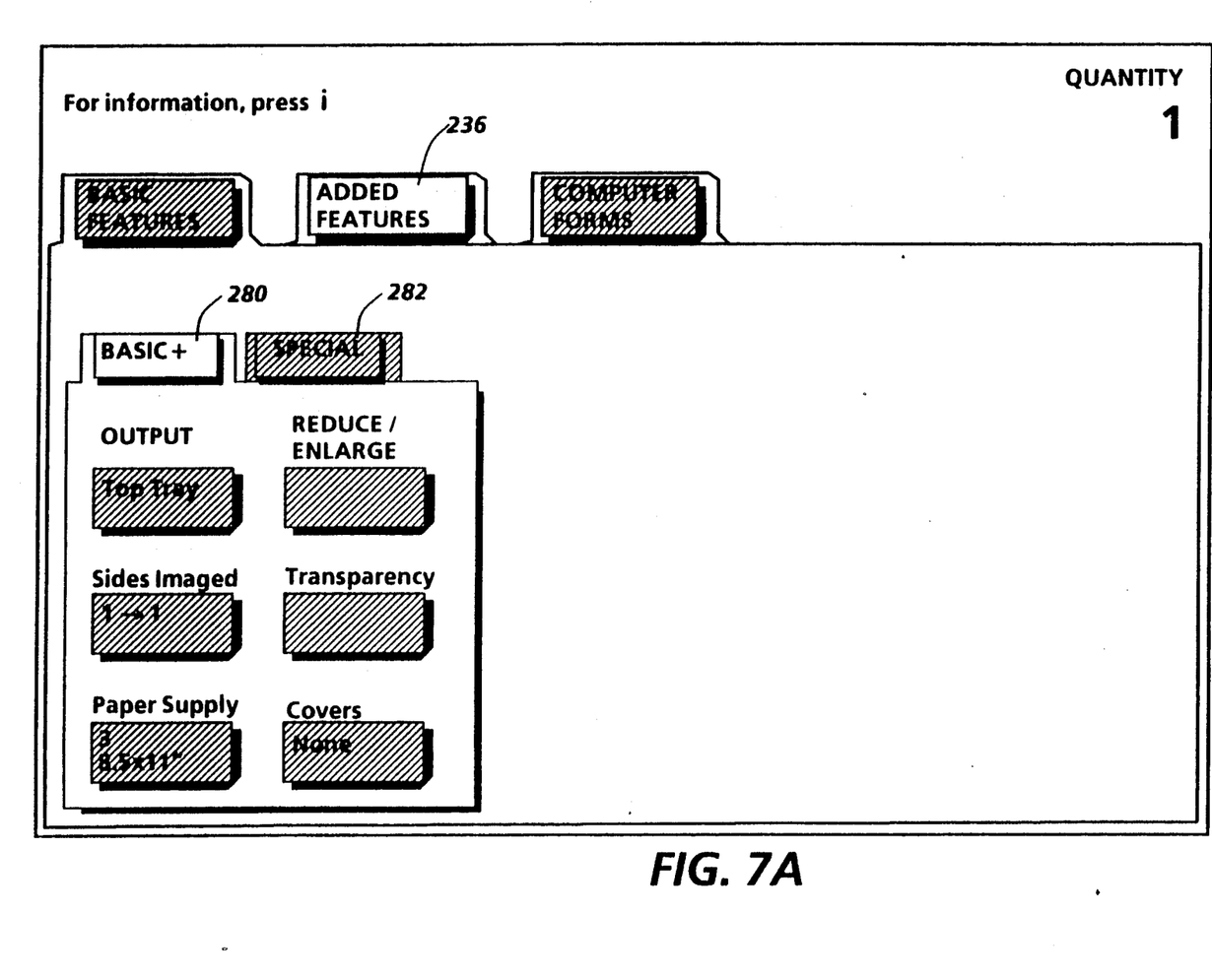
FIGS. 7A and 7B are subsequent screen displays for the operation of the machine of FIG. 1.
Figure 7B:
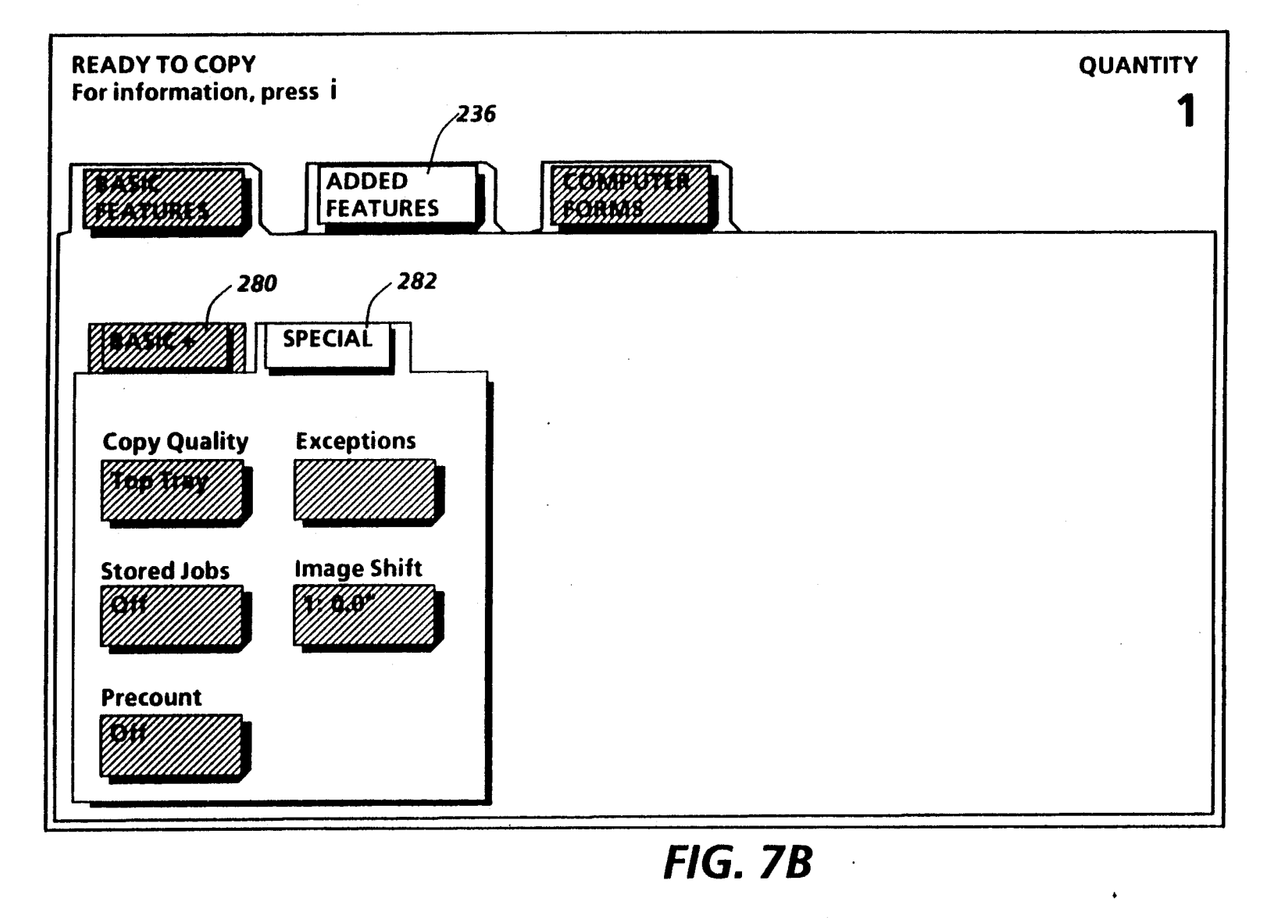

FIGS. 7A and 7B are an illustration of subsequent even more complicated display screens providing the operator with even more features for programming. For example, upon activation of the added features soft button 236 in FIG. 5 the display as shown in FIGS. 7A and 7B will be shown. Added Features are the selections found in Basic Features with additional features included. There are two menus within this programming environment: Basic+and Special as shown at 280 and 282. To the right of each Menu is the Work Area where the feature related to each option appears.

NOTE: Selections unique to Added Features made on this programming screen will be retained should the operator find it necessary to go back into Basic Features to make adjustments and then return to this screen. The Basic+Menu selections include: Paper Supply, Sides Imaged, Output/Stapling, Reduce/Enlarge, Transparency, and Cover as illustrated. The special Menu contains the following options: Precount, Stored Jobs, Coy Quality, Exceptions and Image Shift.

With reference to FIG. 6, in accordance with the present invention, there are also other means to reinforce the concept of the operator touching a soft button of the screen display. For example, upon actuation of the soft button 268 an audio signal could be provided to reinforce the on state of the touch target or soft button upon actuation by the operator. The soft button 268 could also change appearance, either in text, color, or shape to against reinforce the concept that in fact an action or switch has responded to the engagement by the operator of the soft button on the display screen. It should also be noted that there are various means to convey information to an operator. Operator prompts or the conveyance of information to the operator could be done by highlighting icons, showing flow charts or trees, and relatively more or less detail of frames.

Icons could also displayed in a color code. For example, a specific icon or image display could be green for a collated mode and red for an uncollated mode, conveying the information that selecting uncollated would create a conflict. Also, pictorial representations, such as flow charts or trees, displayed when a specific selection is made could illustrate for the operator the specific route or sequence of programming steps ahead and identify options. Fault frames typically display of operator's specific machine zones to clear. For an untrained operator, more detail of the fault zones could be shown.

While the invention has been described with reference to the structure disclosed, it is not confined to the details set forth, but is intended to cover such modifications or changes as may come within the scope of the following claims.

We claim:

1. In a reproduction machine having a control and user interface with a touch screen display for providing operator prompts and selectable features for programming the operation of the machine, the method of inviting the operator into a touch screen environment by introducing the touch screen display to an operator comprising the steps of:

providing a soft touch target having the appearance of a hard button, the button having an identifiable on state and an identifiable off state, displaying an abstract rendition of a hand, the abstract rendition of the hand including a symbolic finger, the symbolic finger pointing toward said touch target, the symbolic finger and touch target conveying the image of a hard button, displaying a linear design suggesting the function of image document manipulation by the pressing of the touch target, and providing text messages to reinforce the hard button image provided by the combination of the soft touch target and the abstract rendition of the hand.

2. The method of claim 1 including the step of providing an audio signal to reinforce the on state of the touch target.

3. The system of claim 1 including the step of selectively omitting the display of the abstract rendition of the hand.

4. A reproduction machine having a control and user interface with a touch screen display for providing operator prompts and selectable features for programming the operation of the machine to coordinate a plurality of operating components to produce reproductions of images on support material comprising:

a soft touch target on said screen display having the appearance of a hard button, the button having an identifiable on state and an identifiable off state, rendition of a hand on said screen display, the rendition of the hand including a finger impression, the finger impression pointing toward said touch target, the finger and touch target conveying the image of a hard button, text messages on the screen display to reinforce the hard button image of the combination of the soft touch target and the abstract rendition of the hand, and means to provide a signal to reinforce the one state of the touch target.

5. In a reproduction machine having a control and user interface with a touch screen display for programming the operation of the machine to coordinate a plurality of operating components to produce reproductions of images on support material, means for coaxing an operator into dialogue with the machine by means of the interface comprising:

means to exhibit a first frame on the touch screen display of the user interface, an actuator displayed on the first frame, a pointer displayed adjacent to the actuator, the pointer simulating a human action with respect to the actuator, the human action suggesting to the operator the manual engagement of the actuator, means responsive to the manual engagement of the actuator to provide subsequent frames on the touch screen display of the user interface, the subsequent frames providing progressively more complex operator options and means for exhibiting a linear image expressing the operation of document manipulation.

6. The machine of claim 5 wherein the pointer is a rendition of a human hand expressing the action of a finger touching the actuator.

7. The machine of claim 5 including means for displaying a rendition of a hand, the rendition of the hand including a finger impression, the finger impression pointing toward said touch target, the finger and touch target conveying the image of a hard button.

8. The machine of claim 7 including means for providing text messages to reinforce the hard button image by the combination of the soft touch target and the rendition of the hand.

9. The machine of claim 5 wherein the linear image includes first linear display and a second linear display, the second linear display being at an angle with respect to the first linear display.

* * * * *